United States Patent
Abe et al.

(10) Patent No.: US 7,598,993 B2
(45) Date of Patent: Oct. 6, 2009

(54) IMAGING APPARATUS AND METHOD CAPABLE OF READING OUT A PLURALITY OF REGIONS

(75) Inventors: Kouki Abe, Hino (JP); Takashi Kumazawa, Hino (JP); Sei Makino, Hino (JP); Junji Kishi, Hino (JP)

(73) Assignee: Toshiba Teli Corporation, Hino-shi, Tokyo (JP)

( * ) Notice: Subject to any disclaimer, the term of this patent is extended or adjusted under 35 U.S.C. 154(b) by 454 days.

(21) Appl. No.: 11/011,014

(22) Filed: Dec. 13, 2004

(65) Prior Publication Data

US 2005/0094010 A1 May 5, 2005

Related U.S. Application Data

(63) Continuation of application No. PCT/JP03/03732, filed on Mar. 26, 2003.

(30) Foreign Application Priority Data

Jun. 13, 2002 (JP) ............................. 2002-172794

(51) Int. Cl.
  *H04N 3/14* (2006.01)
(52) U.S. Cl. ..................................... 348/302
(58) Field of Classification Search ................ 348/126, 348/133, 296, 302, 308, 311, 312
  See application file for complete search history.

(56) References Cited

U.S. PATENT DOCUMENTS

| | | | | |
|---|---|---|---|---|
| 4,539,598 A * | 9/1985 | Dietrich et al. | ............. | 348/319 |
| 4,638,362 A * | 1/1987 | Oshima et al. | .............. | 348/317 |
| 5,267,296 A | 11/1993 | Albert | ......................... | 378/113 |
| 5,541,654 A * | 7/1996 | Roberts | ....................... | 348/301 |
| 6,184,928 B1 * | 2/2001 | Kannegundla et al. | ...... | 348/294 |
| 6,320,934 B1 | 11/2001 | Carroll et al. | .............. | 378/98.8 |
| 6,333,992 B1 * | 12/2001 | Yamamura et al. | .......... | 382/149 |
| 6,509,927 B1 * | 1/2003 | Prater et al. | .............. | 348/222.1 |
| 6,900,837 B2 * | 5/2005 | Muramatsu et al. | ......... | 348/243 |
| 2003/0193593 A1 * | 10/2003 | Lee et al. | ..................... | 348/302 |
| 2004/0169767 A1 * | 9/2004 | Norita et al. | ................ | 348/350 |

FOREIGN PATENT DOCUMENTS

| | | |
|---|---|---|
| EP | 0994619 | 8/1999 |
| JP | 57-104829 | 6/1982 |

(Continued)

OTHER PUBLICATIONS

International Preliminary Examination Report dated Nov. 28, 2003.

(Continued)

*Primary Examiner*—Timothy J Henn
(74) *Attorney, Agent, or Firm*—Ohlandt, Greeley, Ruggiero & Perle, L.L.P.

(57) ABSTRACT

An imaging unit has a plurality of pixels arrayed two-dimensionally therein, and each pixel has an independent address, and is formed such that each pixel may be assigned with a reading address. A signal processing unit can generate an address for specifying arbitrary plural regions in the imaging region when an imaging signal is read out from the imaging unit.

2 Claims, 7 Drawing Sheets

FOREIGN PATENT DOCUMENTS

| | | |
|---|---|---|
| JP | 06-217964 | 8/1994 |
| JP | 08237550 | 9/1996 |
| JP | 10-262187 | 3/1997 |
| JP | 2000-41186 | 7/1998 |
| JP | 10-285476 | 10/1998 |
| JP | 2000-209509 | 7/2000 |
| JP | 2002-51261 | 8/2000 |
| KR | 1019980023805 | 3/1999 |
| WO | WO 01/38825 | 5/2001 |

OTHER PUBLICATIONS

Official Action dated May 23, 2006 issued from the Korean Intellectual Property Office in regards to corresponding Korean Patent Application No. 10-2004-7020090 with English translation.

Supplemental European Search Report dated Jan. 26, 2007 based on EP Application No. EP03715423.

* cited by examiner

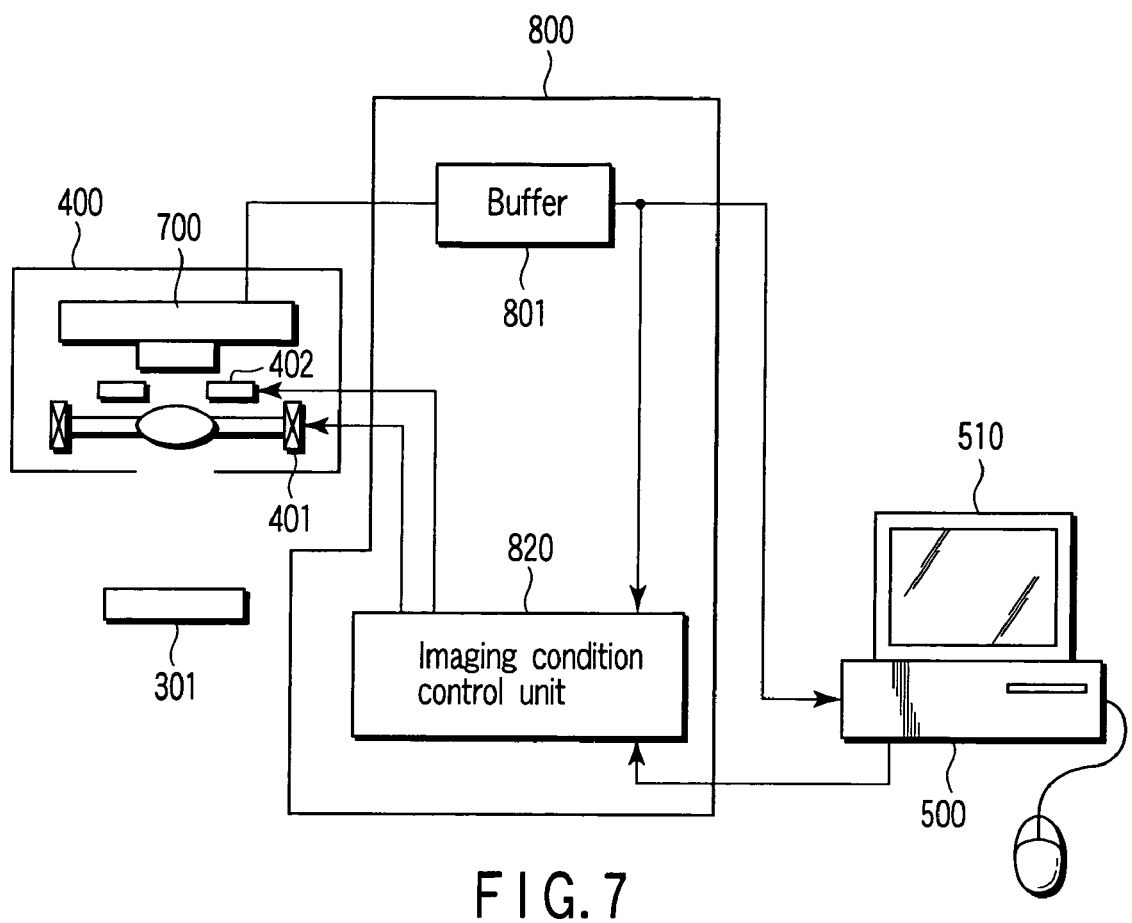
F I G. 7
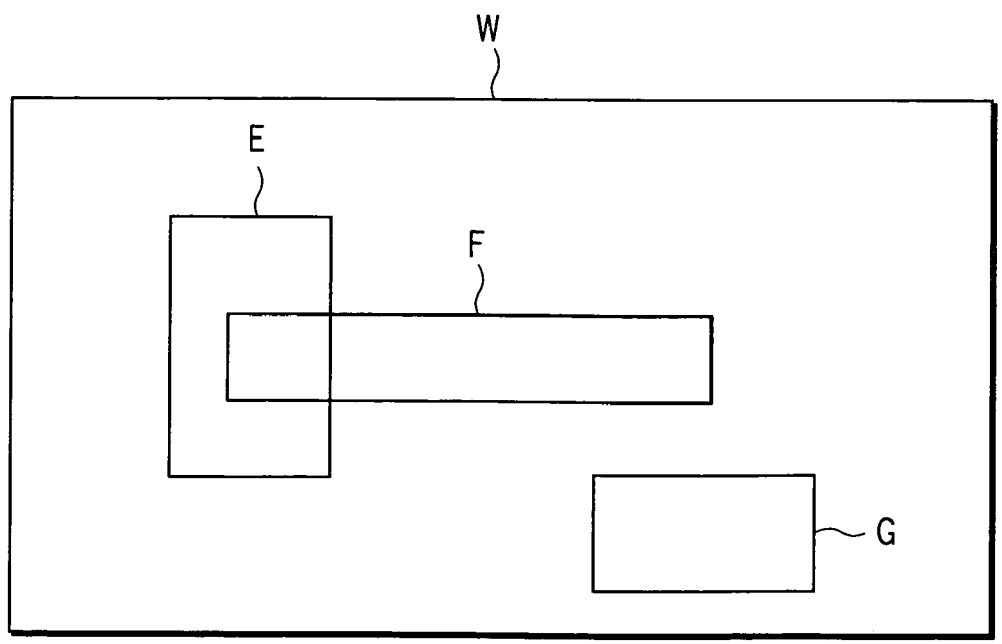
F I G. 8

IMAGING APPARATUS AND METHOD CAPABLE OF READING OUT A PLURALITY OF REGIONS

CROSS REFERENCE TO RELATED APPLICATIONS

This is a Continuation Application of PCT Application No. PCT/JP03/03732, filed Mar. 26, 2003, which was published under PCT Article 21(2) in Japanese.

This application is based upon and claims the benefit of priority from prior Japanese Patent Application No. 2002-172794, filed Jun. 13, 2002, the entire contents of which are incorporated herein by reference.

BACKGROUND OF THE INVENTION

1. Field of the Invention

The present invention relates to an imaging apparatus and an imaging method, especially using, for example, a CMOS sensor in an imaging unit. More particularly, the invention is applicable as a monitoring apparatus. It can be also used as a parts inspection machine for electronic devices such as a liquid crystal device and a semiconductor device.

2. Description of the Related Art

As an imaging apparatus using photoelectric conversion elements, a CCD type imaging apparatus and a CMOS type imaging apparatus are known. In a CCD type imaging apparatus, photoelectric conversion elements are arrayed two-dimensionally, and imaging signals in field units are read out therefrom. In a CMOS type imaging apparatus, on the other hand, imaging signals in pixel units can be directly read out from photoelectric conversion elements arranged two-dimensionally.

Using such an imaging apparatus, a monitoring system or parts inspection system has been developed. In a conventional monitoring system or parts inspection system, imaging signals are read out from the entire surface of the imaging unit, and the imaging signals are transferred into a monitor or comparator circuit. In a monitoring system, the user checks the image on the monitor screen. In a parts inspection system, the comparator circuit compares a reference pattern and an image pattern of the imaging signal.

In the conventional monitoring system or parts inspection system, since the imaging signal is read out from the entire surface of the imaging unit, the reading time cannot be shortened, and when the imaging signal is converted from analog to digital, the data conversion quantity is a lot of. Accordingly, in the monitoring system, since the entire screen is always displayed, local checking of the image is difficult, and also in the parts inspection system, since the imaging signal of the entire screen is processed, it is hard to inspect at high speed.

BRIEF SUMMARY OF THE INVENTION

It is hence an aspect of the invention to provide an imaging apparatus and method capable of limiting imaging signals obtained from an imaging unit to signals from arbitrary plural regions in an imaging plane, checking local images easily, and processing signals at high speed.

This invention relates to an imaging apparatus for use in an inspection machine which inspects the configuration of plural parts on a substrate, the apparatus comprising: an imaging region having a plurality of X-address lines and a plurality of Y-address lines formed thereon, pixels being formed near the intersections of the X-address lines and the Y-address lines, each pixel having an independent address, and the imaging region being configured to provide each pixel with a reading address; a Y-register to select a desired line out of said plurality of Y-address lines; an X-register to select a desired line out of said plurality of X-address lines; a sequencer which provides the X- and Y-registers with address data for specifying each pixel in plural parts corresponding regions that correspond to the configuration positions of the plural parts on the substrate within the imaging region; an address processor which transfers the address data to the sequencer; and a memory unit including at least a first memory section having stored therein address data for specifying each pixel in regions corresponding to first plural parts, and a second memory section having stored therein address data for specifying each pixel in regions corresponding to second plural parts, as the address data to be given to the address processor, wherein it is applicable even in the case of inspecting substrates different in configuration of plural parts on the substrate.

Another aspect and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

FIG. 7 is an explanatory diagram showing an iris and focus control system in the imaging apparatus according to the invention.

FIG. 8 is a diagram showing another example of setting of regions for reading out imaging signals in the imaging apparatus of the invention.

DETAILED DESCRIPTION OF THE INVENTION

Figure 1:
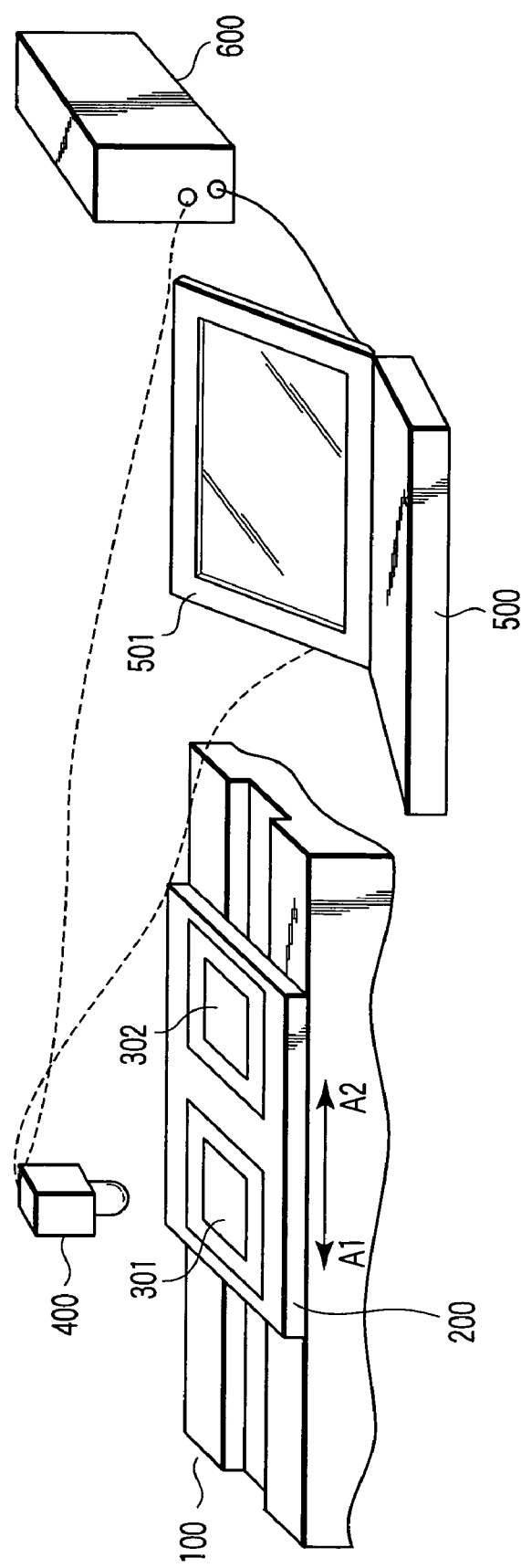
FIG. 1 is an explanatory view showing an outline of a parts inspection system according to the invention.

Referring now to the drawings, an embodiment of the present invention will be described detail below.

FIG. 1 shows a simplified configuration of a parts inspection apparatus to which the invention is applied. Reference numeral 100 is an inspection table, and a carrier board 200 is placed on the top of the inspection table 100, and this carrier board 200 is free to move in the direction of arrow A1-A2 in the diagram, and is automatically controlled by a control unit (not shown).

Test pieces 301, 302 can be put on the top of the carrier board 200. A camera 400 is located at a predetermined position above the inspection table 100. The carrier board 200 can transfer the test pieces 301 and 302 selectively to the lower part of the camera 400 and stop. The camera 400 takes the top of the test piece 301 or 302, and outputs an image signal. The image signal is input into, for example, a personal computer 500, and is shown as an image on a display 501.

Reference numeral 600 is an inspection unit, which can provide the camera 400 with a timing signal, a control signal, address data and the like. The inspection unit 600 can generate address data according to an operation signal from the personal computer 500.

The inspection unit 600 can receive an image signal through the personal computer 500. Receiving an image signal, the inspection unit 600 can compare with reference data, and feed back the pattern comparison result to the personal computer 500.

Figure 2:
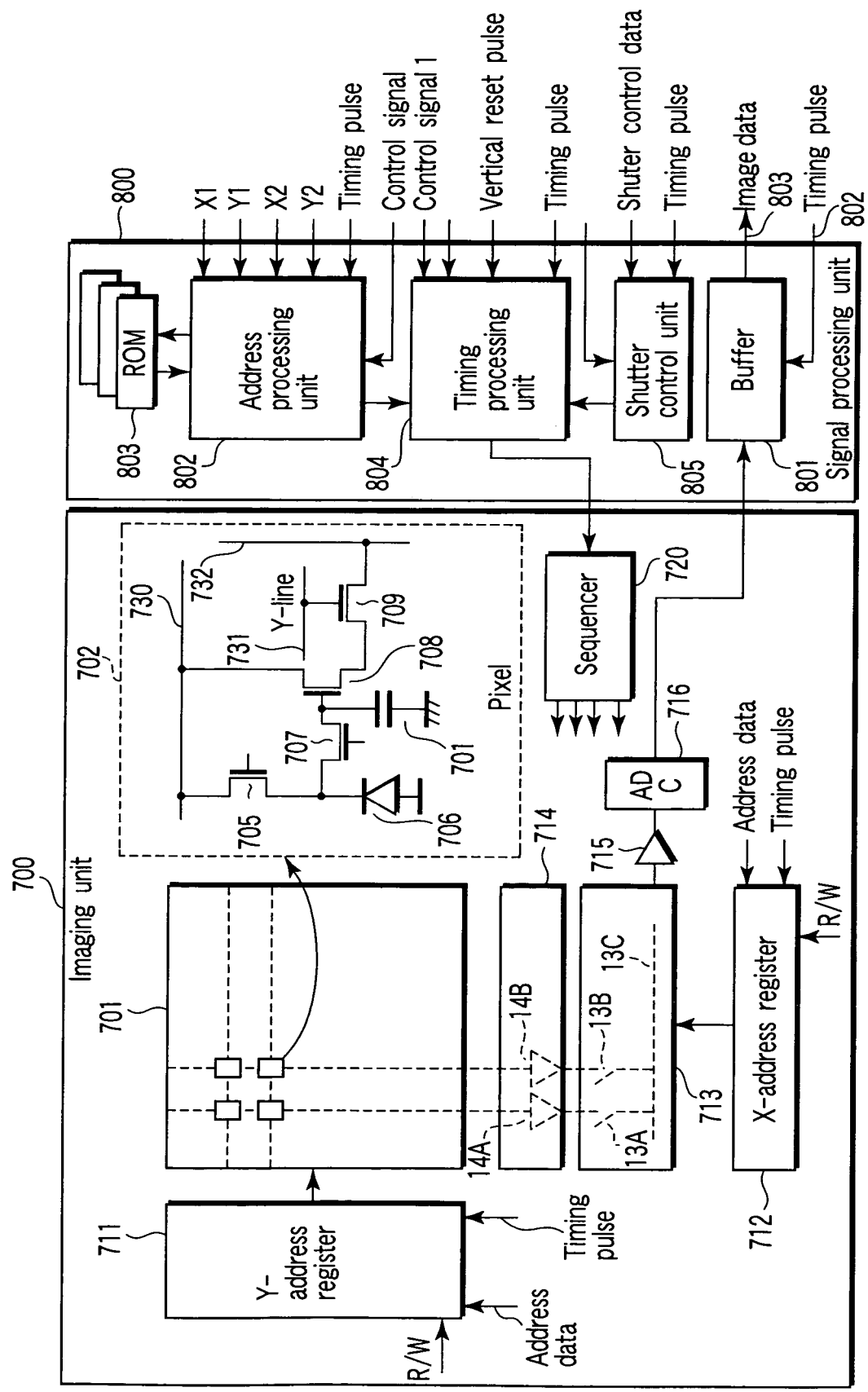
FIG. 2 is block diagram showing a basic configuration according to the invention in a camera in FIG. 1.

FIG. 2 is a block diagram showing essential parts of the camera 400 described above. The camera 400 comprises an imaging unit 700 and a signal processing unit 800. The imaging unit 700 has an imaging region 701 in which plural pixels are arrayed two-dimensionally, and each pixel has an independent address, and a reading address is given to each pixel.

Each pixel is identical in composition, and one is magnified and shown as pixel 702 enclosed by broken line to show a basic composition. Reference numeral 730 is a line for resetting provided with a supply voltage. Reference numerals 731 and 732 are bus lines for specifying the address of the pixel by column and row.

A switch element (for resetting) 705 and a photoelectric conversion element 706 are connected in series between a line 703 and reference potential. An output end of the photoelectric conversion element 706 is connected to input units (gate electrodes) of a capacitor 701 and an amplifying element 708 through a switch element 707 for sampling. One electrode of the amplifying element 708 is connected to the line 730 as the power source, and the other electrode is connected to one electrode of a switch element (for reading) 709. The other electrode of the switch element 709 is an output unit, which is connected to a bus line 732 as a column bus.

When the switch element 705 is turned on, the electric charge in the photoelectric conversion element 706 is discharged and reset. When the switch element 705 is turned off, the photoelectric conversion element 706 begins to be charged depending on the quantity of light from outside. The charge period is limited at the point when the switch element 707 for sampling is turned on. When the switch element 707 for sampling is changed from OFF to ON position, a voltage depending on the electric charge collected in the photoelectric conversion element 706 is supplied into the capacitor 701.

When the switch element 709 is turned on at the reading point, the output current of the amplifying element 708 flows in the line 732 through the switch element 709. That is, in the column bus line 732, a voltage appears in proportion to the electric charge collected in the capacitor 701.

In the diagram, the address line is simplified, but a Y-address register 711 can specify all Y-lines in the imaging region 701 individually. Alternatively, an arbitrary Y-line can be specified.

An X-address register 712 controls an analog multiplexer 713. The analog multiplexer 713 is for taking in the output from a line amplifier 714 connected to each X-line. In FIG. 2, line amplifiers 14A, 14B are shown representatively, but actually they are connected to each X-line. The analog multiplexer 713 has switch elements 13A, 13B corresponding to the line amplifiers 14A, 14B. In FIG. 2, the switch elements 13A, 13B are shown representatively, but actually they correspond to each line amplifier. When the switch elements 13A, 13B are turned on, corresponding X-line signals appear on a common line 13C.

When the switch element 13A or 13B of the analog multiplexer 713 is turned on by the X-address register 712, the signal on the X-line corresponding to the switch element 13A or 13B is put into an amplifier 715.

The output signal of the amplifier 715 is converted into a digital signal by an analog-digital converter (ADC) 716, and is supplied into a buffer 801 in the signal processing unit 800. Data input and output of the buffer 801 is controlled by a timing pulse applied to an input terminal 802. The output from the buffer 801 is sent out to an output terminal 803 as image data.

Corresponding to the Y-address register 711 and X-address register 712 of the imaging unit 700, the Y- and X-address data can be set. The Y- and X-address data can be set by way of a sequencer 720 from the signal processing unit 800. When the Y- and X-address data are set, the Y-address register 711 and X-address register 712 are set in the writing mode. Consequently, the Y-address data and X-address data are output from the sequencer 720, and a timing pulse (writing clock) is given to the Y-address register 711 and X-address register 712.

A method of setting Y-address data and X-address data is not limited to this explanation, but various methods are possible. For example, plural stages of address registers are prepared in the Y-address register 711, and address data is preliminarily latched in one Y-address register (for presetting), and when this address data is needed, it is transferred in batch to the other Y-address register (for operation). In this case, the reading address can be changed in a short time.

The sequencer 720 not only writes and reads each address data of the Y-address register 711 and X-address register 712, but also outputs the timing pulse of each part in the imaging unit 700. For example, there are a reset pulse for giving to the pixel, a sampling pulse, and a reading timing pulse. Further, the sequencer 720 also outputs a clock and a timing pulse to the analog-digital converter (ADC) 716.

The signal processing unit 800 has address control means for arbitrarily controlling the address set in the Y-address register 711 and X-address register 712 in the imaging unit 700.

The address processing unit 802 can take in address setting data from outside. Address setting data preliminarily stored in a ROM 803 can be also taken into the address processing unit 802. Whether to select the address setting data from outside or address setting data from the ROM 803 is determined by a control signal.

The address processing unit 802 generates Y-address data or X-address data depending on the address setting data, and gives to a timing processing unit 804. The timing processing unit 804, as explained above, gives the Y-address data and X-address data to the sequencer 720. As a result, address data is set in the Y-address register 711 and X-address register 712. The timing of setting the address data is determined by a control signal that is given to the timing processing unit 804.

After setting of address data in the Y-address register 711 and X-address register 712, an imaging signal is read out from the imaging unit 700. The process of obtaining the imaging signal from the imaging unit 700 is the procedure of resetting, exposing, sampling and signal reading. For resetting, an exposure pulse is input into the switch element for resetting, and each pixel in the imaging region 701 is reset in batch before start of exposure operation.

Next is the exposure operation. The exposure time is determined by shutter control data given to a shutter control unit 805. The shutter control data is given to a timing processing unit 804. The timing processing unit 804 sets the period from reset point till output of the sampling pulse on the basis of the shutter control data.

Reading of imaging signal is executed when a reading start pulse is given to the Y-address register 711 and X-address register 712. The output timing of the reading start pulse is also determined by the timing processing unit 804. The output timing of the reading start pulse is determined by the control signal given to the timing processing unit 804.

Figure 3:
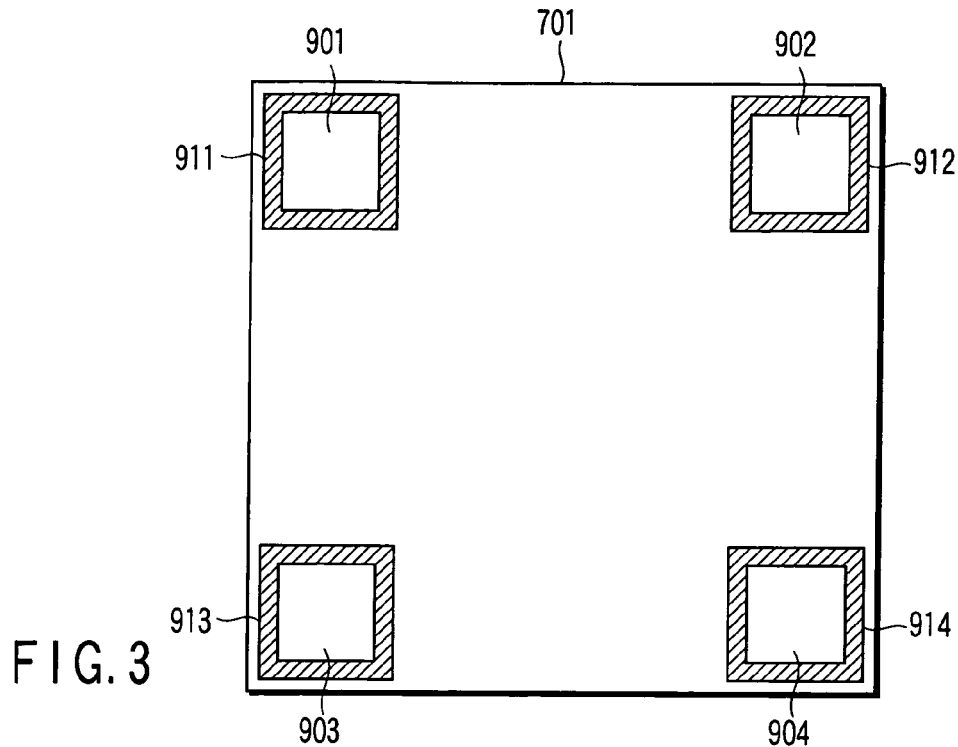
FIG. 3 is a diagram showing an example of setting of imaging regions in an imaging apparatus of the invention.

FIG. 3 shows an example of an image projected in the imaging region 701. In this example, subject images 901, 902, 903, 904 are projected in four corners of the imaging region. In the case of such imaging environment, the regions set by the Y-address register 711 and X-address register 712 are regions 911, 912, 913, 914 including the subject images 901, 902, 903, 904.

FIG. 4, FIG. 5A to FIG. 5F, and FIG. 6A are simplified principle explaining diagrams for describing the reading timing of imaging signals when the reading regions are set partially as explained above, and show reading regions and various timings.

Figure 4:
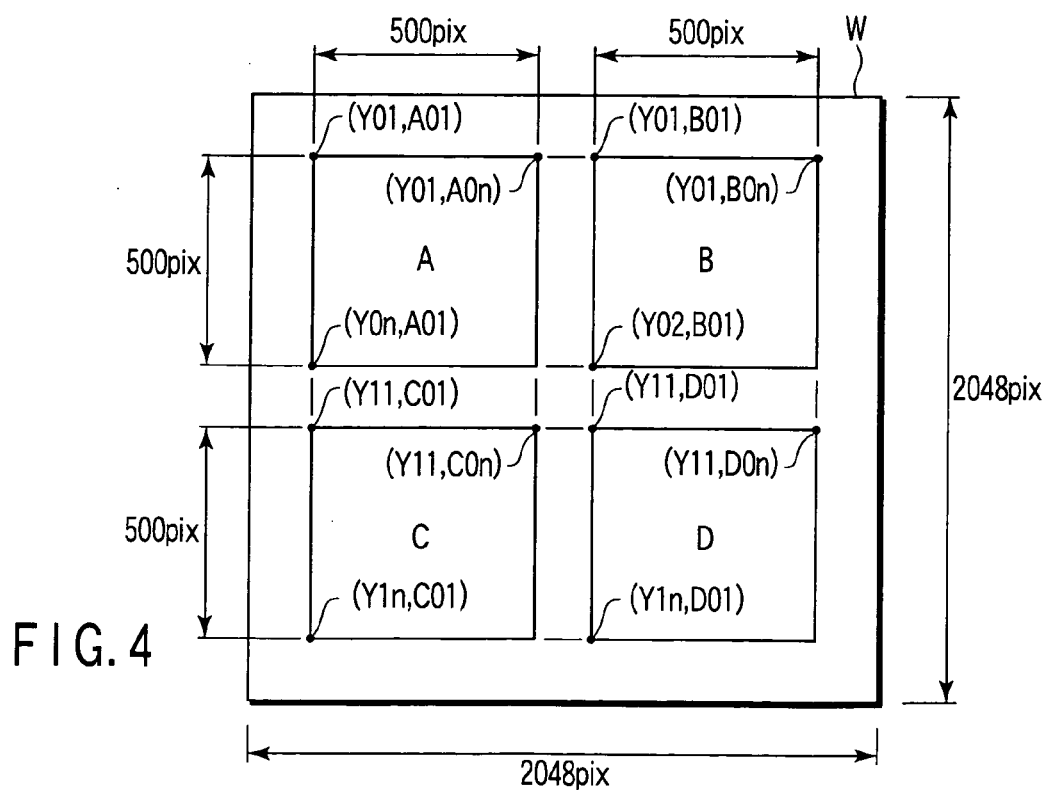
FIG. 4 is a diagram showing an example of the case where imaging regions are set for explaining an example of operation of the imaging apparatus of the invention.

As shown in FIG. 4, in a whole region W to be imaged, it is assumed that start addresses of certain regions A, B, C, D are (Y01, A01), (Y01, B01), (Y11, C01), and (Y11, D01). The number of pixels in the entire imaging region is 2048×2048 pixels. In each one of regions A, B, C, D, the number of pixels is 500×500 pixels.

Figure 5:
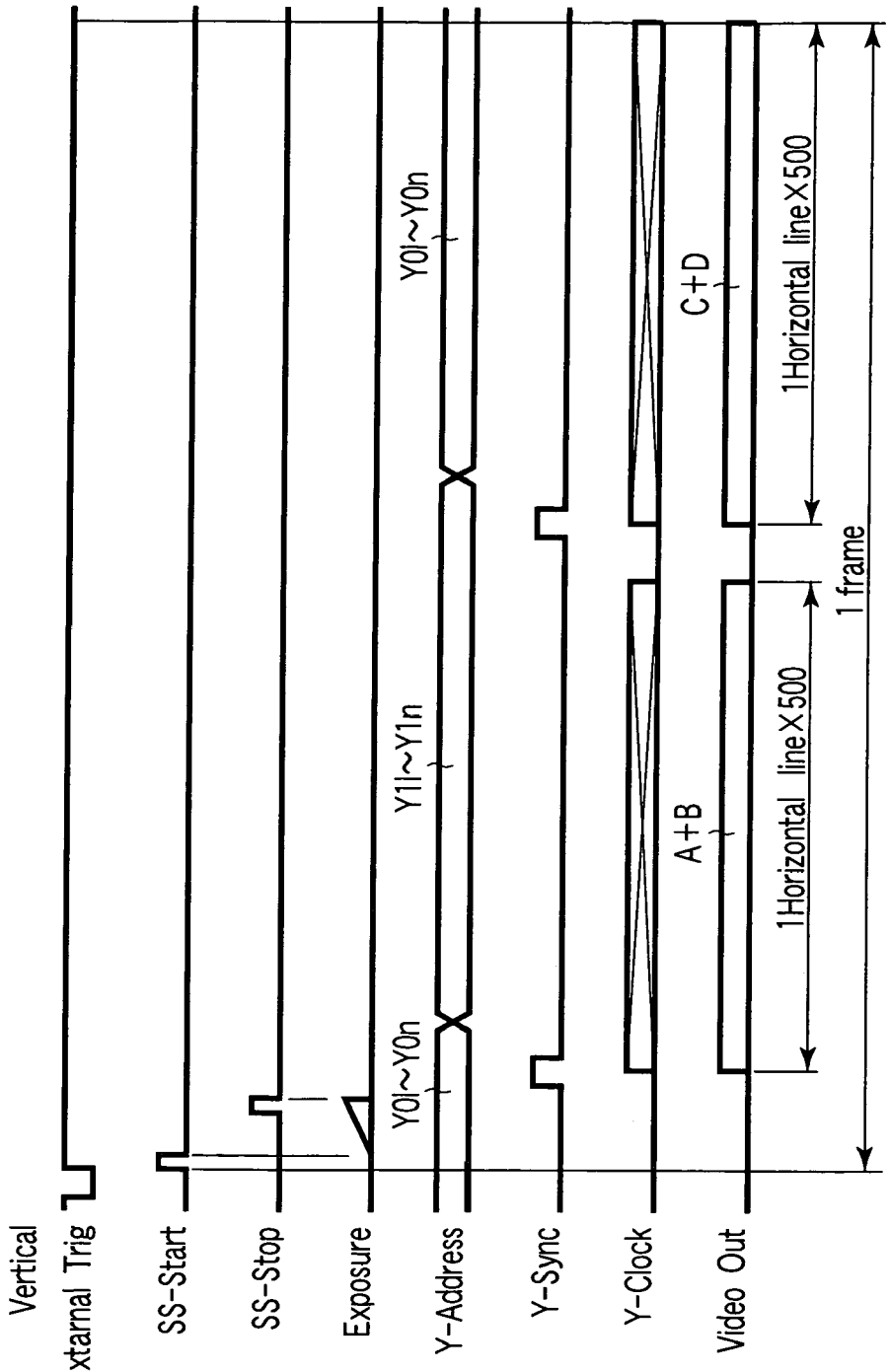
FIG. 5A to FIG. 5H are time charts showing timing signals relating to the Y-direction for reading out imaging signals from the imaging regions in FIG. 4.

In FIG. 5A to FIG. 5F, specifically, FIG. 5A shows a trigger pulse, which is given as a control signal to the timing processing unit 804. In consequence, a shutter start pulse (corresponding to the reset pulse) in FIG. 5B is given to the imaging region 702. Exposure of the photoelectric conversion element starts, and a shutter end pulse (corresponding to the sampling pulse) is given to the imaging region 702 after a reset time determined by the shutter control data (FIG. 5C). In the period from the shutter start pulse till the shutter end pulse, the photoelectric conversion element is exposed, and an electric charge is collected (FIG. 5D).

In the Y-address register 711, a vertical synchronizing pulse (FIG. 5F) is given, and at the same time, the data for specifying the first address Y01 is set (FIG. 5E).

The vertical synchronizing pulse mentioned herein is different in meaning from the vertical synchronizing pulse of a video camera or the like, and it refers to the pulse for setting the Y-direction address in the register.

Next, a clock pulse (FIG. 5G) is given to the Y-address register 711. As a result, the reading address in the Y-direction in the regions A, B is incremented. Hence, the data in the regions A, B is read out. This increment is added by one each every time a horizontal synchronizing signal is given to the Y-address register 711 as a timing pulse.

When the address in the Y-direction reaches address Y0n, a vertical synchronizing pulse (FIG. 5F) is given to the Y-address register 711. At this time, the sequencer 720 gives the address Y11 to the Y-address register 711.

As a result, the address in the Y-direction jumps to Y11. Next, a change is made in addresses Y11 to Yin in the Y-direction. That is, the reading address in the Y-direction in the regions C, D is incremented. Thus, the data in the regions C, D is read out.

Figure 6:
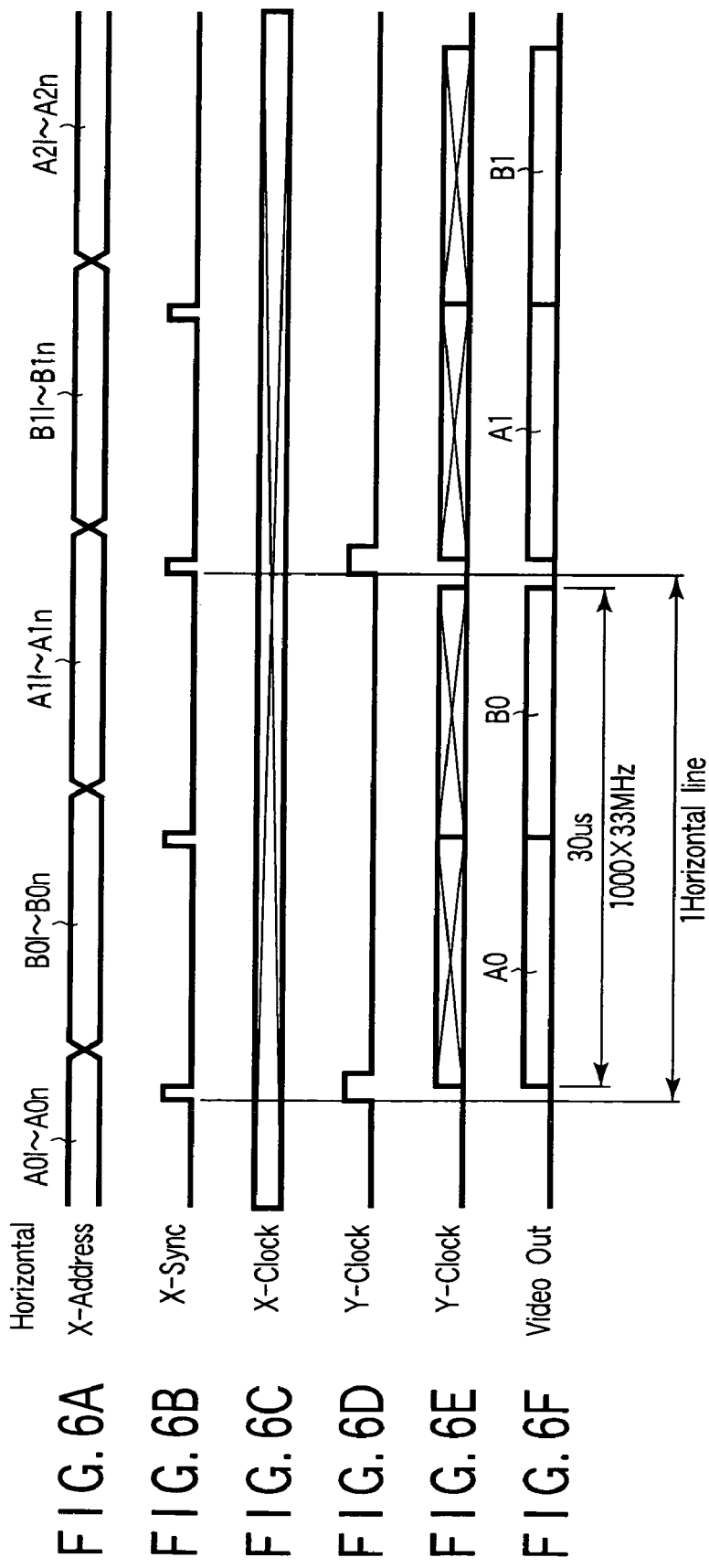
FIG. 6A to FIG. 6F are time charts showing timing signals relating to the Y-direction for reading out imaging signals from the imaging regions in FIG. 4.

FIG. 6A to FIG. 6F show relation of address changes and reading regions in the X-direction. In the X-address register 712, a first horizontal synchronizing pulse (FIG. 6B) is given to the X-address register 712 by way of the sequencer 720, and data for specifying the address A01 is given at the same time (FIG. 6A). As a result, the address A01 is outputted from the X-address register 712, and it is incremented to change from A01 to A0n. This change is obtained as the clock pulse (FIG. 6C) is given to the X-address register 712.

When the address in the X-direction reaches the address A0n, a horizontal synchronizing pulse is given to the X-address register 712, and the data for specifying the address B01 is given at the same time. As a result, the address in the X-direction jumps to B01. Thereafter, it is incremented to change from B01 to B0n.

When the address in the X-direction reaches the address B0n, a horizontal synchronizing pulse is given again to the X-address register 712, and the data for specifying the address A11 is given at the same time (FIG. 6A). As a result, the address A11 is issued from the X-address register 712, and it is incremented to change from A11 to A1n.

In this way, at every horizontal synchronizing pulse, the reading start position changes from setting data A01, B01, to A11, B11, A21, B21, . . . , C01, D01.

Thus, by the Y-address and X-address, data in the regions A, B, C, D are read out.

Features of the imaging apparatus and method capable of reading out a plurality of regions mentioned above may be summarized as follows.

When an imaging signal is read out from the imaging unit 700, there is provided the signal processing unit 800 which generates the address for specifying arbitrary plural regions in the imaging region. The pixel 702 has the photoelectric conversion element 706, and switch elements 705, 707, 708, and 709 for resetting this photoelectric conversion element, exposing, and reading out the signal from the photoelectric conversion element. It also includes a plurality of address lines.

The imaging unit 700 comprises the Y-address register 711 for selecting an arbitrary line out of plural Y-address lines, the X-address register 712 for selecting an arbitrary line out of plural X-address lines, and the sequencer 720 for providing at least the X-, Y-address registers with address data for specifying arbitrary plural regions. The signal processing unit 800 has the address processing unit 802 for transferring address data to the sequencer 720.

The signal processing unit 800 may also have a memory (RAM or ROM 803) having stored therein address data for specifying arbitrary plural regions A, B, C, D.

The signal processing unit 800 may also have plural memories (ROM 803) having the address data stored therein in order to change the sequence position (combination) of plural regions. The address processing unit 802 may also have an address input unit for taking therein the address data for specifying plural regions from outside.

The imaging unit 700 takes images of plural inspection subjects, and the signal processing unit 800 may have means for changing the sequence position of plural regions depending on the inspection subjects.

The structure may further comprise a display for monitoring imaging signals from the imaging unit 700, an iris mechanism and a focus mechanism of the front surface of the imaging unit, and an imaging condition control device for controlling the iris mechanism and focus mechanism.

The imaging condition control device controls the iris mechanism and focus mechanism on the basis of imaging signals in the plural regions.

FIG. 7 shows a mode of use of the apparatus of the invention. The camera 400 has a focus adjusting mechanism 401 and an iris adjusting mechanism 402. The focus control signal and iris control signal are given from the imaging condition control unit 820. Herein, the imaging condition control unit 820 is controlled on the basis of the video signal obtained from the buffer 801.

The imaging condition control unit 820 creates focus and iris control data as follows. Initially, the camera 400 takes the entire image of the inspection subject 301. The taken image is shown in the display 510 of the personal computer 500. The user manipulates, for example, a mouse 511, and specifies desired plural regions (for example, A, B, C, D as mentioned above), and encloses by a window frame. By execution command, consequently, image data of the specified regions A to D is output in the buffer 801. The image data is taken into the imaging condition control unit 820.

Herein, (1) the iris is controlled. The imaging condition control unit 820 outputs and varies the iris control data. In the midst of variation of iris control data, when the luminance of the image data reaches a desired range, the iris control data is fixed. Next, (2) high frequency components of image data are extracted, and the focus control data is output for adjustment. In the midst of variation of focus control data, when the high frequency component reaches the peak, the focus control data is determined. Herein, the steps (1) and (2) may be repeated.

In this explanation, the plural regions A to D to be inspected are isolated and independent in the imaging plane. However, the apparatus of the invention is not limited to such regions, and partially overlapped regions may be also set easily.

FIG. 8 shows an example in which regions E, F, G are set in the whole region W, and partially overlapped regions E, F are set.

Figure 9:
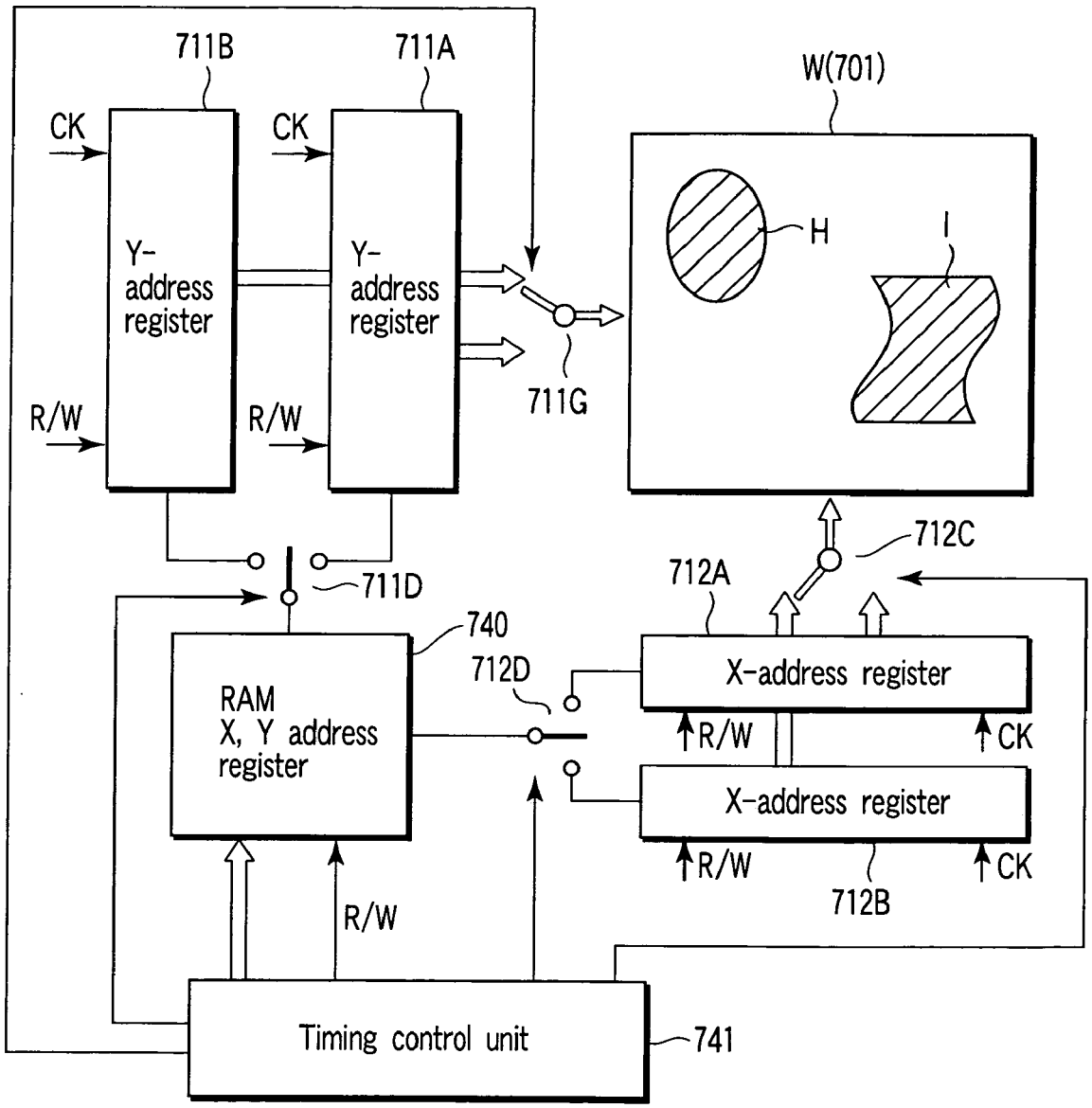
FIG. 9 is a diagram showing another example of setting of regions for reading out imaging signals in the imaging apparatus of the invention.

FIG. 9 shows another example of the apparatus of the invention. This apparatus is suited to a case of changing over the address at high speed. In the prior explanation, the regions A to D are square, and the X-address and Y-address are incremented. However, the apparatus of the invention may have curved regions. Such regions may be also applied in the foregoing embodiment. In this apparatus, there is a sufficient time allowance in address setting.

As shown in FIG. 9, assuming that regions H, I are set. In this case, the Y-address registers 711A, 711B are changed over alternately. When the address data of one Y-address register 711A (or 711B) is used, region specifying data for the next Y-address is written in the other Y-address register 711B (or 711A). A switch 711C is a switch for determining to use which data of the Y-address register 711A or 711B, and a switch 711D is a switch for determining to write address data in which one of the Y-address registers 711A, 711B.

The address data is output from a memory (RAM) 740. On the other hand, the X-address registers 712A, 712B are also changed over alternately. When the address data of one X-address register 712A (or 712B) is used, region specifying data for the next X-address is written in the other X-address register 712B (or 712A). A switch 712C is a switch for determining to use which data of the X-address register 712A or 712B, and a switch 712D is a switch for determining to write address data in which one of the X-address registers 712A, 712B.

The control timing of each part is set by the timing pulse and clock from a timing control unit 741.

The apparatus of the invention can be used not only as a monitoring system but also as a parts inspection system. When using as a monitoring system, it is effective when specifying the monitoring regions. For example, the entrance to a building or window can be set as a monitoring region. As a parts inspection system, it is effective when inspecting parts arranged on plural positions on a substrate by pattern matching. For example, parts to be inspected are disposed in the regions A to D.

Parts to be inspected include IC chips and semiconductor element parts. Not limited to parts, it is effective also when checking the characters, numbers and symbols printed on the printed circuit board or components. It is effective when checking whether or not specified parts are arranged correctly on the printed circuit board.

In the apparatus of the invention, moreover, since addresses of the regions A to D are specified, it is easy to incorporate image data from other regions than the regions A to D. It is hence effective to check whether or not undesired parts are put on other regions than the regions A to D, or check whether or not there is any defect (such as flaw) in other regions than the regions A to D.

The apparatus can incorporate only image data of necessary plural regions. To the contrary, it is not necessary to fetch image data of unnecessary regions or image data of all regions.

As a result, after a first exposure, the time required for fetching the image (reading time) from the imaging region is substantially shortened as compared with the prior art. It means that the inspection time can be shortened.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus for use in an inspection machine which inspects the configuration of plural parts on a substrate, the apparatus comprising:

an imaging region having a plurality of X-address lines and a plurality of Y-address lines formed thereon, a plurality of pixels being formed near the intersections of the X-address lines and the Y-address lines, each pixel having an independent address, wherein the imaging region provides each pixel with a reading address;

a first Y-register and a second Y-register to select an arbitrary line out of said plurality of Y-address lines;

a first X-register and a second X-register to select an arbitrary line out of said plurality of X-address lines;

a sequencer which provides the X- and Y address data for specifying each pixel corresponding regions that correspond to the configuration positions of the plural parts on the substrate within the imaging region;

a first switch that supplies output address data from the sequencer to the first Y-register or the second Y-register;

a second switch that supplies output address data from the first Y-register or the second Y-register to a plurality of the plurality of Y-address lines;

a third switch that supplies output address data from the sequencer to the first X-register or the second X-register;

a fourth switch that supplies output address data from the first X-register or the second X-register to a plurality of the plurality of X-address lines;

an address processor which transfers the address data to the sequencer; and a memory unit including at least a first memory section having stored therein address data for specifying each pixel in regions corresponding to first plural parts, and a second memory section having stored therein address data for specifying each pixel in regions corresponding to second plural parts, as the address data to be given to the address processor, so that a plurality of substrates, having different configurations of the plural parts mounted thereon, can be inspected.

2. The imaging apparatus according to claim 1, further comprising:

a display to monitor an imaging signal from the imaging unit, an iris mechanism and a focus mechanism on the front side of the imaging unit, and an imaging condition control device which controls the iris mechanism and focus mechanism, wherein the imaging condition control device controls the iris mechanism and focus mechanism on the basis of the imaging signals from the plural regions.

* * * * *